(12) United States Patent  (10) Patent No.: US 8,919,804 B2
Svihla  (45) Date of Patent: Dec. 30, 2014

(54) HEAVY DUTY VEHICLE MULTI HITCH AND ALIGNMENT SYSTEM

(71) Applicant: Daniel James Svihla, Portland, OR (US)

(72) Inventor: Daniel James Svihla, Portland, OR (US)

(*) Notice: Subject to any disclaimer, the term of this patent is extended or adjusted under 35 U.S.C. 154(b) by 0 days.

(21) Appl. No.: 13/900,373

(22) Filed: May 22, 2013

(65) Prior Publication Data

US 2014/0346755 A1 Nov. 27, 2014

(51) Int. Cl.
*B60D 1/36* (2006.01)

(52) U.S. Cl.
CPC ..................... *B60D 1/363* (2013.01)
USPC ........................................ 280/495

(58) Field of Classification Search
CPC ............ B60D 1/06; B60D 1/07; B60D 1/015; B60D 1/48
USPC ........ 280/416.1, 477, 511, 515; 403/306, 632
See application file for complete search history.

(56) References Cited

U.S. PATENT DOCUMENTS

| 3,864,048 | A | * | 2/1975 | Parker | 403/27 |
| 4,596,406 | A | * | 6/1986 | Van Vleet et al. | 280/511 |
| 4,781,394 | A | * | 11/1988 | Schwarz et al. | 280/477 |
| 4,840,392 | A | * | 6/1989 | Baskett | 280/477 |
| 4,871,185 | A | * | 10/1989 | Chakroff et al. | 280/477 |
| 4,889,356 | A | * | 12/1989 | Morris | 280/416.1 |
| 4,961,590 | A | * | 10/1990 | Davenport | 280/477 |
| 5,080,386 | A | * | 1/1992 | Lazar | 280/477 |
| 5,116,072 | A | * | 5/1992 | Swenson | 280/511 |
| 5,330,196 | A | * | 7/1994 | Ricles | 280/477 |
| 5,465,992 | A | * | 11/1995 | Anderson | 280/477 |
| 5,503,422 | A | * | 4/1996 | Austin | 280/477 |
| 5,511,814 | A | * | 4/1996 | Floyd | 280/507 |
| 5,529,330 | A | * | 6/1996 | Roman | 280/477 |
| 5,566,965 | A | * | 10/1996 | Applegate | 280/500 |
| 5,997,025 | A | * | 12/1999 | Wisecarver | 280/508 |
| 6,481,258 | B1 | * | 11/2002 | Belinky | 72/324 |
| 6,715,781 | B1 | * | 4/2004 | Smith | 280/416.1 |
| 6,976,694 | B1 | * | 12/2005 | Rayl et al. | 280/477 |
| 7,909,350 | B1 | * | 3/2011 | Landry | 280/479.2 |
| 8,091,914 | B1 | * | 1/2012 | Long | 280/477 |
| 8,430,419 | B2 | * | 4/2013 | Garth | 280/491.1 |
| 2004/0032112 | A1 | * | 2/2004 | Reese et al. | 280/477 |
| 2006/0097480 | A1 | * | 5/2006 | Hegefeld | 280/477 |
| 2007/0057485 | A1 | * | 3/2007 | Lones | 280/416.1 |
| 2009/0267323 | A1 | * | 10/2009 | Belinky et al. | 280/511 |
| 2010/0117332 | A1 | * | 5/2010 | Harlin | 280/477 |
| 2010/0127479 | A1 | * | 5/2010 | Weipert et al. | 280/491.1 |

(Continued)

OTHER PUBLICATIONS

Douglas Wright, DANotes: Threaded fasteners: Introduction, available at http://www-mdp.eng.cam.ac.uk/web/library/enginfo/textbooks_dvd_only/DAN/threads/intro/intro.html (May 2005).*

*Primary Examiner* — Joseph M Rocca
*Assistant Examiner* — Gabriela C Craciun
(74) *Attorney, Agent, or Firm* — Mark S. Hubert

(57) ABSTRACT

An improved trailer hitching system adaptable to quick coupling with both ball and pintel hook trailer couplers without the need to remove the pintel hook trailer coupler. The system incorporates an improved trailer hitch ball capable of meeting or exceeding all the Class I-V trailer hitch ball load requirements and dimensional tolerances yet with enhanced protection against crack development at the ball/ball stem. The ball can be sized for different purposes without being removed from the tow vehicle. It also includes a removable trailer hitch alignment system that can align both pintel hooks and the various sizes of trailer tongues.

15 Claims, 7 Drawing Sheets

(56) References Cited

U.S. PATENT DOCUMENTS

2010/0264626 A1* 10/2010 Morehead .................... 280/477
2013/0127137 A1* 5/2013 McCoy et al. ................ 280/511
2013/0313805 A1* 11/2013 Holland ........................ 280/477
2014/0091554 A1* 4/2014 Columbia .................... 280/511

* cited by examiner

HEAVY DUTY VEHICLE MULTI HITCH AND ALIGNMENT SYSTEM

BACKGROUND OF THE INVENTION

The present invention relates to a vehicle hitch system adapted to provide both safety and convenience for the user. More particularly, to a trailer hitch and alignment system that adapts to receive, in a guided fashion, the most common, commercially available trailer hitches.

Trailering different loads requires different towing connections between the vehicle and the trailer. These connections differ in both design and in their load capacities. Not all companies can afford to have a separate vehicle dedicated to pulling a trailer with a single hitch. Changing hitches and or adapter plates is time consuming as is the time taken to align the hitch with the trailer to be coupled. Misaligned couplings frequently result in broken or damaged equipment. These can weaken the trailer balls as well causing small crack propagations to begin at the interface at the intersection of the ball and the ball stem. Increasing the size of these balls is not an option as there are industry standards set for these dimensions, generally Class I-V utilize 1⅞", 2" and 2 5/16" diameter balls. Using exotic steels for the construction drives the prices up considerably and increases the chance of theft.

Henceforth, a trailer hitch system that would quickly adapt to receive different purpose hitch devices, allow for the precise alignment of a trailer tongue or pintel hook, and simplify their alignment would fulfill a long felt need in the trailer towing industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a complete solution to the above mentioned trailer coupling issues including a multi use base plate, an interchangeable multi function coupling guide and a quick change, crack propagation resistant ball assembly.

It has many of the advantages mentioned heretofore and many novel features that result in a new heavy duty vehicle multi hitch and alignment system which is not anticipated, rendered obvious, suggested, or even implied by any of the prior art, either alone or in any combination thereof.

In accordance with the invention, an object of the present invention is to provide an improved trailer hitching system adaptable to quick coupling with both ball and pintel hook trailer couplers without the need to remove the pintel hook trailer coupler.

It is another object of this invention to provide an improved trailer hitch ball capable of meeting or exceeding all the Class I-V trailer hitch ball load requirements and dimensional tolerances yet with enhanced protection against crack development at the ball/ball stem interface.

It is a further object of this invention to provide a trailer hitch ball that can be sized for different purposes without being removed from the tow vehicle.

It is still a further object of this invention to provide for a trailer hitch alignment system that can accommodate both pintel hooks and the various sizes of trailer tongues.

It is yet a further object of this invention to provide a trailer hitch alignment system that is easily attached to or removed from an existing receiver setup and can accommodate the various sizes and configurations of trailer hitches.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
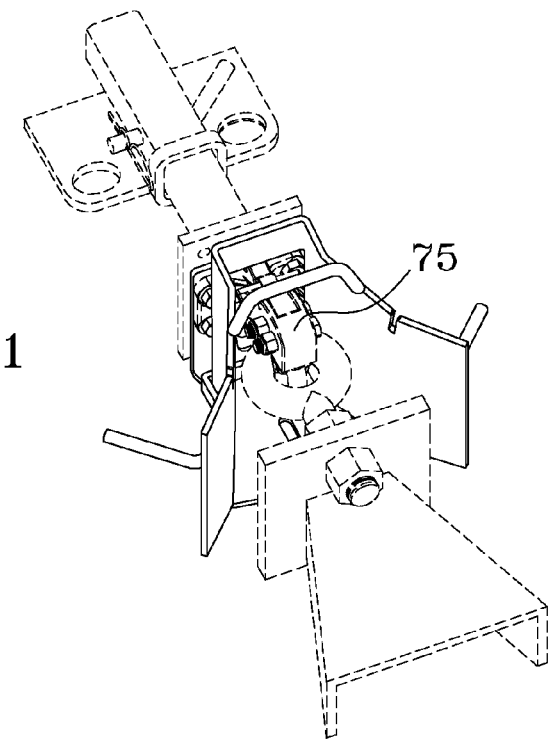
FIG. 1 is a front perspective view of the coupling between a pintel hook and a pintel hook coupler with the pintel hook alignment wedge installed.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 4:
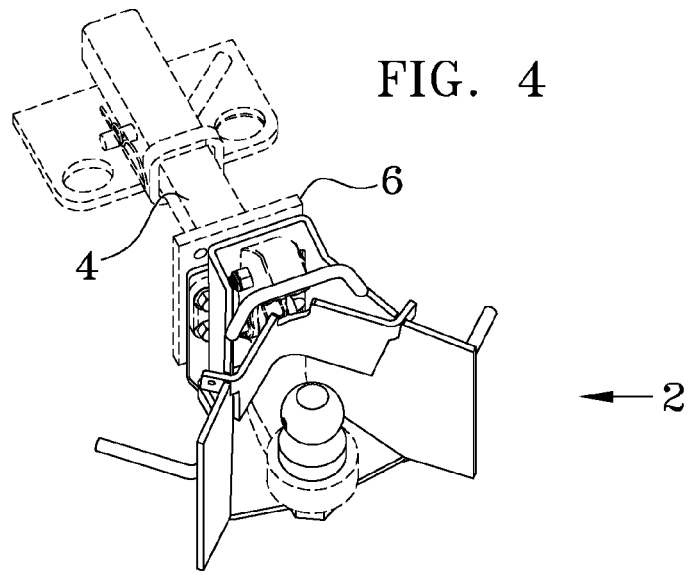
FIG. 4 is a front perspective view of a ball with the pintel hook coupler still in place, the pintel hook alignment wedge installed and the ball mount alignment plate inserted.
Figure 6:
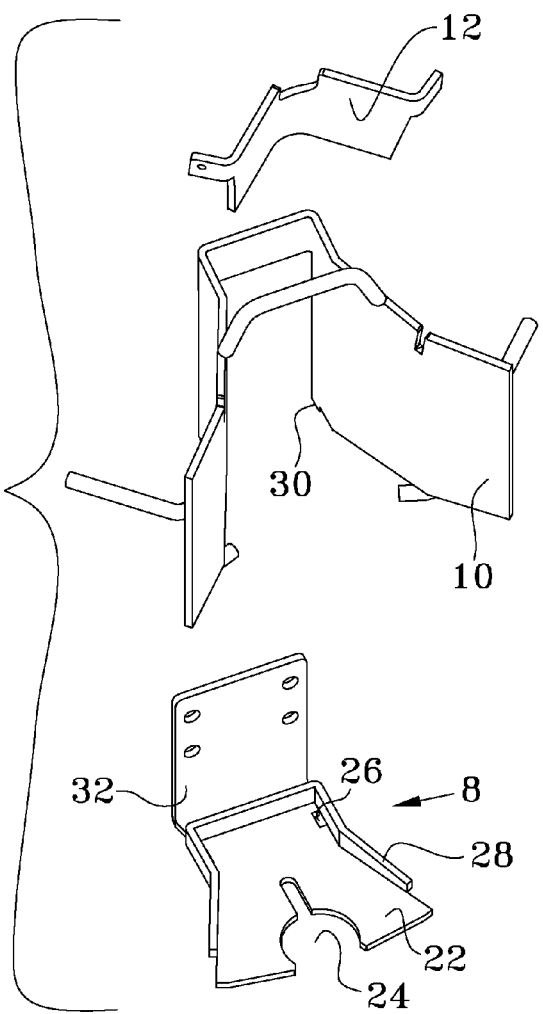
FIG. 6 is an exploded front perspective view of the base plate, the pintel hook alignment wedge and the ball mount alignment plate inserted.
Figure 7:
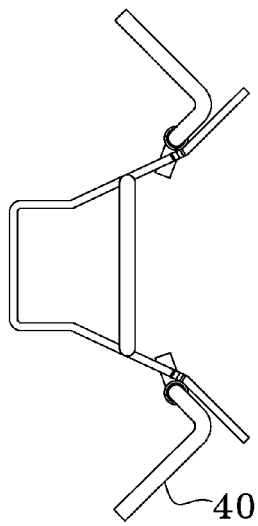
FIG. 7 is a top view of the pintel hook alignment wedge.
Figure 8:
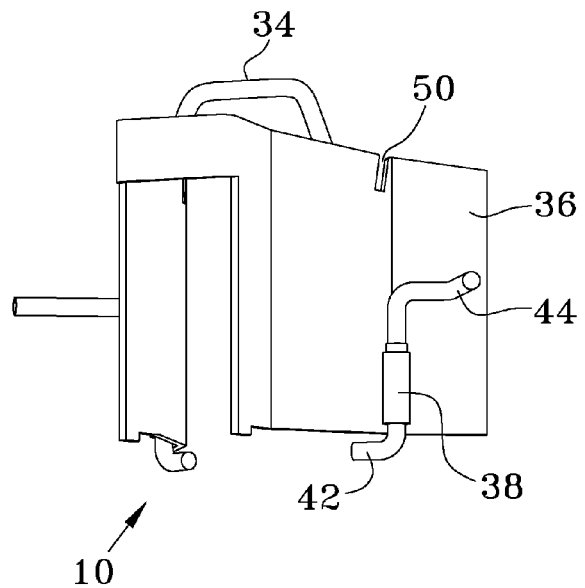
FIG. 8 is a rear perspective view of the pintel hook alignment wedge.
Figure 9:
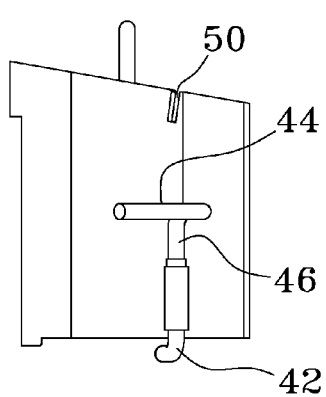
FIG. 9 is a side view of the pintel hook alignment guide.
Figure 10:
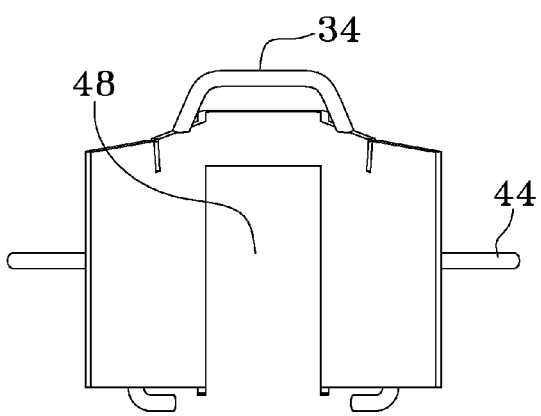
FIG. 10 is a front view of the pintel hook alignment wedge.
Figure 11:
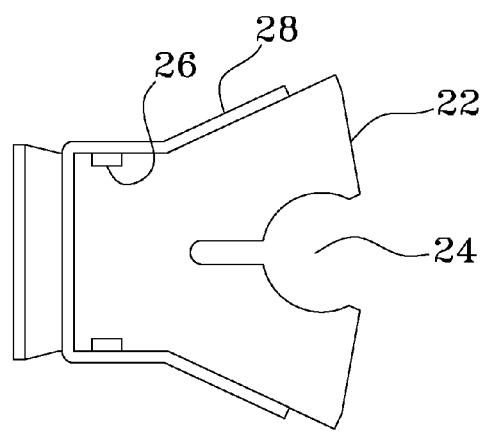
FIG. 11 is a top view of the base plate.
Figure 12:
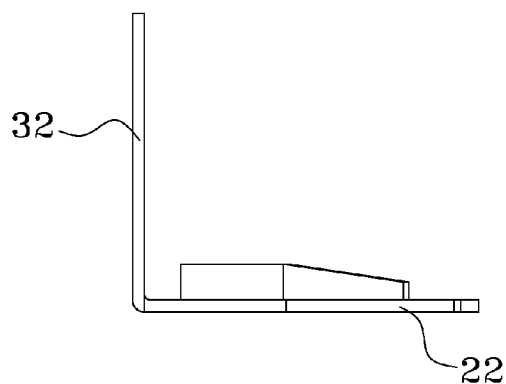
FIG. 12 is a side view of the base plate.
Figure 13:
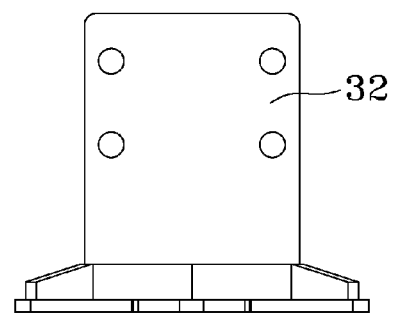
FIG. 13 is a front view of the base plate.
Figure 21:
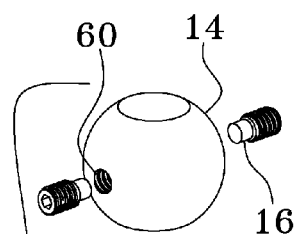
FIG. 21 is an exploded perspective view of the interchangeable ball assembly.
Figure 21:
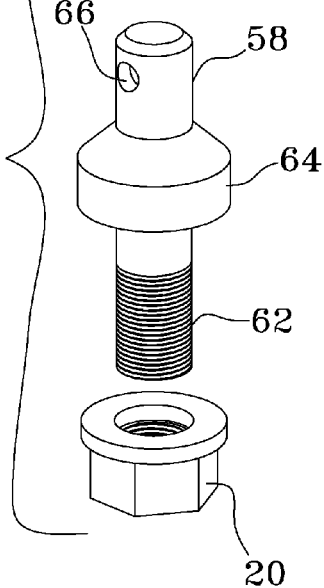
Figure 19:
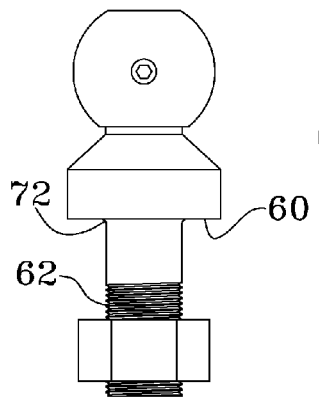
FIG. 19 is a rear view of the interchangeable ball assembly.
Figure 20:
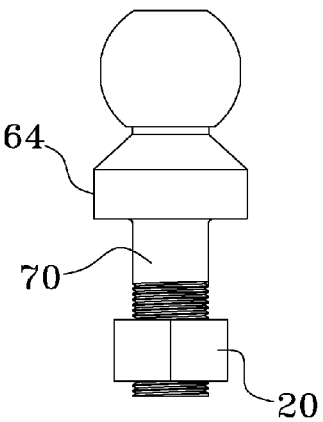
FIG. 20 is a side view of the interchangeable ball assembly.

FIG. 4 shows the heavy duty vehicle multi hitch and alignment system 2 installed onto a trailer hitch receiver tube 4 with a mounting plate 6. The various components of the system can best be seen looking at the exploded views of FIGS. 6 and 21. The system 2 consists of a base mount 8, a removable pintel hook alignment wedge 10, a ball mount alignment plate 12, an interchangeable ball 14, two ball locks 16, a ball mount stud 18 and a nut 20. When utilized properly, this system allows a vehicle to couple to a trailer with a pintel hitch or a conventionally dimensioned ball hitch without removing the ball and ball mount stud from the towing vehicle.

The base mount 8 is a planar hitch support plate 22 with an orifice cutout 24 thereon that intersects the front peripheral edge of the hitch support plate 22. It can best be seen in FIGS. 11-13 and FIG. 6. The orifice cutout 24 is partially circular in configuration with greater than 180 degrees of the circle existing on the support plate 22. An additional trough is cut at the back of the cutout to allow for the clearance of the pintel hook coupler. The hitch support plate 22 has two tab receiving orifices at the rear. Partially about the side and rear peripheral edges of the support plate 22 is a flange 28 to guide the installation of the pintel hook alignment wedge 10 such that when in place, the tabs 30 of the alignment wedge will seat into the tab receiving orifices 26 of the support plate 22. Extending normally from the support plate is the mounting flange 32. This flange 32 may be welded to the support plate 22 or they may be formed from a single piece of steel. The flange 32 has bolt receiving orifices formed therethrough that are aligned with the commercial pattern of bolt receiving orifices on the trailer hitch receiver tube's mounting plate 6. (Shown in phantom lines.)

The removable pintel hook alignment wedge 10 as best illustrated in FIGS. 7-10 is a generally U shaped steel walled wedge with a wall strengthening support connected to and spanning between the two sides of the U along the top peripheral edge of the sides. This serves to prevent inelastic deformation of the side walls 36 when the side walls 36 are contacted by a misaligned trailer hitch. At the back of the wedge 10 is dado 48 to allow the wedge 10 to fit over the trailer hitch receiver tube's mounting plate 6/mounting flange 32 combination. From each side of the walls 36 is affixed locking arm posts 38 that receive the pivotable locking arms 40. The locking arms 40 are bent cylindrical rods that pivotally, partially reside in the locking arm posts 38. The locking arms 40 are bent so as to have a tail 42 and a handle 44 that extend from the central vertical post section 46 of the locking arm posts 38. When the alignment wedge 10 is matingly engaged into the base mount 8 (such that it resides adjacent the flange 28 with its tabs 30 seated into the tab receiving orifices 26) the locking arm handles 44 are pulled towards the front of the alignment wedge 10 until they contact the sides 36 of the alignment wedge 10. This causes the post section 46 to rotate in the locking arm posts 38 such that the tail 42 frictionally contacts the bottom of the hitch support plate 22 and locks the alignment wedge 10 to the base mount 8. It is to be noted that the tails do not extend truly horizontal from the vertical axis of the post section 46, but rather they have a slightly downward taper so that as the locking arms 40 are rotated the alignment wedge 10 is drawn into tighter frictional engagement with the support plate 22. Along the top peripheral edge of each wall 36 a locating slot 50 is cut. The locating slot 50 is cut into the walls 36 at an acute angle with respect to the bottom peripheral edge of the walls 36 such that that the locating slot 50 leans toward the open side of the U shaped pintel hook alignment wedge 10.

Figure 5:
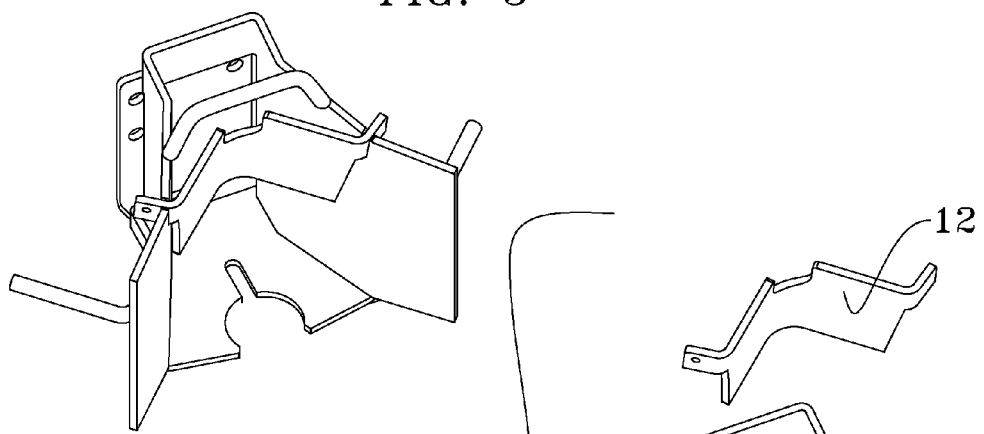
FIG. 5 is a front perspective view of the base plate, the pintel hook alignment wedge installed and the ball mount alignment plate inserted.
Figure 14:
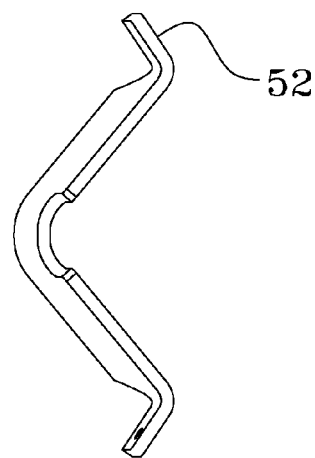
FIG. 14 is a top view of the ball mount alignment plate.
Figures 15, 16:
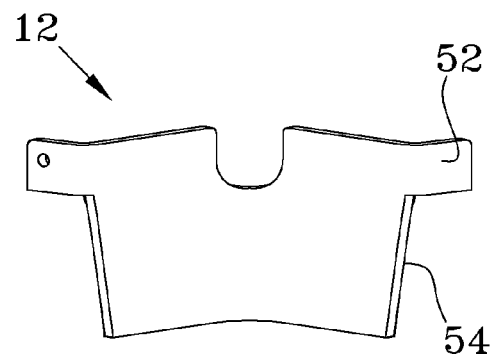
FIG. 15 is a side view of the ball mount alignment plate.
FIG. 16 is a front view of the ball mount alignment plate.
Figure 17:
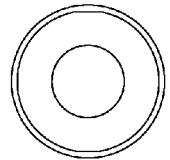
FIG. 17 is a top view of the interchangeable ball assembly.
Figure 18:
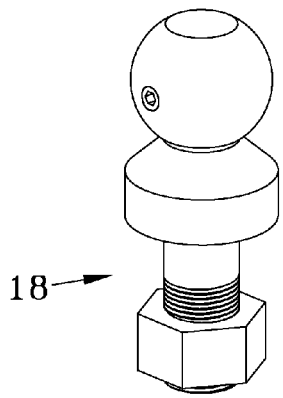
FIG. 18 is a side perspective view of the interchangeable ball assembly.

Looking at FIGS. 14-16 the ball mount alignment plate 12 can best be seen. This plate 12 is a V shaped steel plate with two locating tabs 52 extending approximately normal (90 degrees) from its peripheral sides 54 at the intersection of the top and side peripheral edges such that it appears to a have a W shape when viewed from the top. These locating tabs 52 are received into the locating slots 50 in the walls 36 of the wedge 10 so that the majority of the ball mount alignment plate resides within the U shaped void created by the wedge 10, below the top peripheral edge of the wedge 10. Because of the forward angled pitch of the locating slots 50, the ball mount alignment plate 12 resides on an angle within the wedge 10, having its bottom surface closer to the vertical cutout 48 of the wedge 10. This downward angle serves to aid in the coupling of a trailer's ball mount hitch. (FIG. 5) There is a cutout at the top of the ball mount alignment plate 48 to accommodate the pintel hook locking mechanism.

The interchangeable ball mount can best be seen in FIGS. 17-20. It is made of an interchangeable ball 14, two ball locks 16, a ball mount stud 18 and a nut 20. The ball 14 is made in the different outside dimensions of 1 and ⅞", 2" and 2 and 5/16" diameters to accommodate the standard industry ball receiving hitches. The ball 14 is generally spherical with a stopped cylindrical recess formed therein and extending upwards from the bottom face of the ball. The stopped cylindrical recess is sized to accommodate the ball connection peg 58 therein such that the top end of the ball mount stud 18 contacts the bottom of the inner recess in the ball 14.

The ball mount stud 18 is a unitary, cylindrical piece of steel having a threaded distal end 62 to engage the nut 20 and a ball connection peg 58 formed at the proximate end. There is a partially conical seating flange 64 located between the distal and proximate ends extending from the root diameter of the stud 18, and two stopped bores 66 formed into the ball connection peg with their axes at 90 degrees to the linear axis of the stud 18, and located 180 degrees apart. Where the bottom face of the seating flange 68 meets the unthreaded shaft portion 70 there is a radiused, circumferential stress relief groove 72 cut. This stress relief groove 72 removes any sharp interface (90 degrees or less) between the flange 64 and the unthreaded shaft portion 70. This eliminates any crack initiation and propagation at this interface. The groove eliminates any point loading encountered when a sideways force is exerted on the ball 14 and acts to spread out such forces over enough of the steel at this radiused interface to drastically raise the level of tensile loading without failure of the assembly. The diameter of the stress relief groove 72 generally is limited to a maximum of 25% of the diameter of the unthreaded shaft portion 70.

There are two threaded ports 60 extending normally from the stopped cylindrical recess of the ball 14 at approximately 180 degrees apart on the surface of the ball 14 that align with the two stopped bores 66 formed into the ball connection peg 58. The ball locks 16 are essentially partially threaded heavy duty set or grub screws 16 that threadingly engage the threaded ports 60 such that the non threaded portion extends into the two stopped bores 66 formed into the ball connection peg 58. In this way any of the various diameter balls 14 can be quickly locked onto the ball stud 18 without removing the ball stud 18 from the vehicle.

Figure 3:
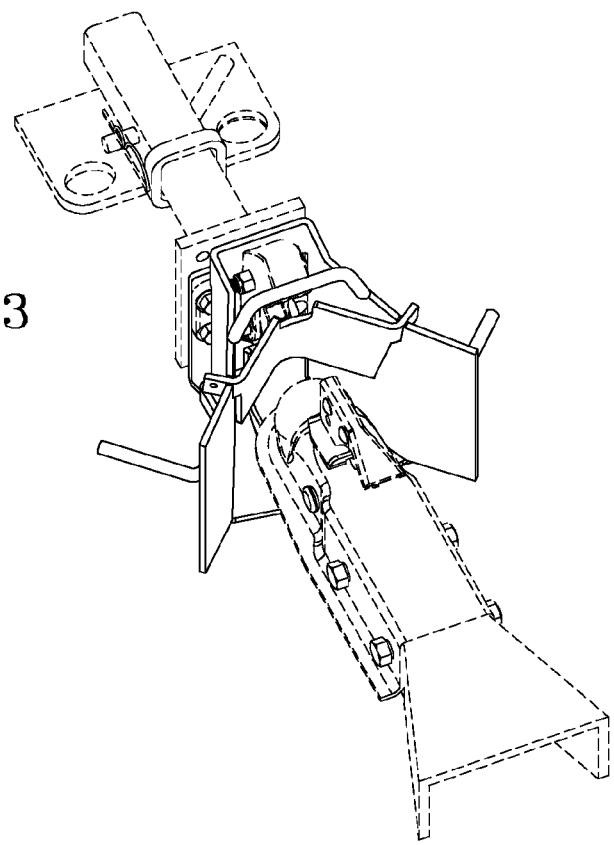
FIG. 3 is a front perspective view of the coupling between a ball and trailer tongue with the pintel hook coupler still in place, the pintel hook alignment wedge installed and the ball mount alignment plate inserted.

In operation, the base mount 8 is bolted to the mounting plate 6 on the trailer hitch receiver tube 4. For a conventional ball hitch coupling, (FIGS. 3 and 4) a trailer hitch receiver tube 4 with a mounting plate 6 is attached to the tow vehicle.

A pintel hook coupler 75 is also bolted onto the mounting plate 6 so that it resides atop of the rear of the support plate 22. An appropriately sized ball's stopped cylindrical recess is placed onto the ball connection peg 58 such that the top end of the ball mount stud 18 contacts the bottom of the inner recess in the ball 14. Both ball locks are threadingly engaged into the threaded ports 60 such that the non threaded portion extends to their maximum extents into the two stopped bores 66 in the ball connection peg 58 thus locking the ball 14 onto the ball stud 16. The ball stud 16 is placed through the orifice cutout 24 in the support plate 22 until the bottom face of the seating flange 68 meets top face of the support plate 24 and the unthreaded shaft portion 70 resides below the bottom face of the support plate. The nut 20 is engaged onto the threaded portion of the ball stud 62. From this point on the ball stud 16 never needs to be removed again, rather only the ball 14 needs to be switched with a different sized ball as the situation requires.

The pintel hook alignment wedge 10 is placed onto the support plate 22 of the base mount 8 with its tabs 30 seated into the tab receiving orifices 26 of the support plate 22. The pintel hook coupler 75 extends through the dado 48 of the wedge 10. The locking arm handles 44 are pulled towards the front of the alignment wedge 10 until they contact the sides 36 of the alignment wedge 10 causing the post section 46 to rotate in the locking arm posts 38 such that the tail 42 frictionally contacts the bottom of the hitch support plate 22 and locks the alignment wedge 10 to the base mount 8. The ball mount alignment plate's locating tabs 52 are placed into the locating slots 50 in the walls 36 of the wedge 10 so that the majority of the ball mount alignment plate 12 resides within the U shaped void created by the wedge 10, below the top peripheral edge of the wedge 10. Now, as a vehicle is backed up, the trailer's ball mount hitch will contact the V shape of the alignment plate 12 and will be guided by the forward angled pitch of the plate 12 into the bottom or crotch of the alignment plate 12 directly above the ball 14. When the trailer is lowered, the ball mount hitch will drop onto the ball 14 and can be coupled. Now the alignment plate 12 is removed and the locking arm handles 44 are pulled towards the back of the alignment wedge 10 thus rotating the post sections 46 in the locking arm posts 38 such that the tail 42 disengages from the bottom of the hitch support plate 22 and unlocks the alignment wedge 10 from the base mount 8 such that it can be lifted off of the support plate 22.

Figure 2:
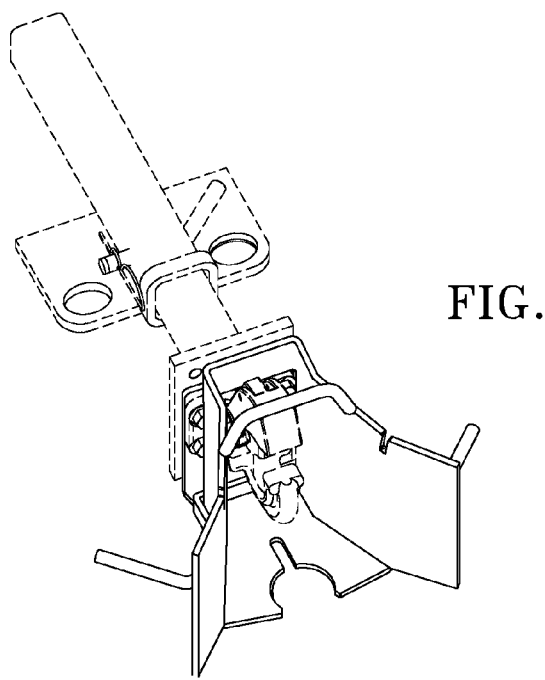
FIG. 2 is a front perspective view of a pintel hook coupler with the pintel hook alignment wedge installed.

For a pintle hook coupling (FIGS. 1 and 2) the above procedure is followed except that there is no need for the ball mount alignment plate 12. When the vehicle is backed up the pintel hook contacts the sides of the alignment wedge 10 and stops when it is centered over the ball 14. The trailer is then lowered until the pintel hook passes over the ball 14 and the pintel hook look can be engaged.

The above description will enable any person skilled in the art to make and use this invention. It also sets forth the best modes for carrying out this invention. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

I claim:

1. A heavy duty vehicle multi hitch and alignment system for connection to a receiver tube mounting plate on a towing vehicle, and that allows a vehicle to couple to a trailer with a pintle hitch or a conventionally dimensioned ball hitch without removing the ball and ball mount stud from the towing vehicle, comprising:
   a base mount that may be removably bolted to a towing vehicle's receiver tube mounting plate;
   a pintle hook alignment wedge that is removably affixed to said base mount;
   a ball mount alignment plate that is removably affixed to said pintle hook alignment wedge;
   a ball mount stud removably affixed to said base mount by engagement with a nut thereon;
   a trailer hitch ball removably affixed to said ball mount stud; and
   at least one ball lock that threadingly engages said trail hitch ball to said ball mount stud; and
wherein said base mount is a planar hitch support plate with a mounting flange extending normally therefrom, and having bolt receiving orifices formed there through said hitch support plate that are aligned with a pattern of bolt receiving orifices on said receiver tube mounting plate, and wherein said hitch support plate has a partially circular orifice formed thereon that is greater than 180 degrees in circumference and which intersects a front peripheral edge of said hitch support plate, and two tab receiving orifices formed thereon said hitch support plate.

2. The multi hitch and alignment system of claim 1 wherein said pintle hook alignment wedge has at least one tab extending therefrom for mating engagement with said tab receiving orifices and at least one slot formed therein to removably receive said ball mount alignment plate.

3. The multi hitch and alignment system of claim 2 wherein said pintle hook alignment wedge is a U shaped steel walled wedge with a wall strengthening support connected to a top peripheral edge of said wedge.

4. The multi hitch and alignment system of claim 3 wherein said planar support plate has a flange extending from a side peripheral edge and a rear peripheral edge thereof so as to guide the installation of said pintle hook alignment wedge, such that said tabs of the alignment wedge will seat into the tab receiving orifices of said support plate and said pintle hook alignment wedge will be supported by said support plate.

5. The multi hitch and alignment system of claim 4 wherein the number of slots formed therein said pintle hook alignment wedge is two and the number of ball locks is two.

6. The multi hitch and alignment system of claim 5 wherein said ball mount alignment plate is a V shaped steel plate with two locating tabs extending therefrom so as to appear to a have a W configuration when viewed from a top side, said locating tabs configured for mating engagement with said locating slots in said wedge.

7. The multi hitch and alignment system of claim 6 wherein said ball mount alignment plate has a cutout section to accommodate the pintle hook locking mechanism.

8. The multi hitch and alignment system of claim 7 wherein said ball mount stud is a steel post having a partially threaded distal end for engagement with said nut, a proximate end formed into a ball connection peg for engagement with a cylindrical recess formed in said ball, and a partially conical seating flange extending around said steel post and that is located between said distal end and said proximate end.

9. The multi hitch and alignment system of claim 8 wherein said ball mount stud has two stopped bores into said ball connection peg, and that are formed about a common linear axis such that their openings reside 180 degrees apart on said ball connection peg, said bores sized to accommodate said ball mount locks.

10. The multi hitch and alignment system of claim 9 wherein said seating flange has a bottom planar face that resides perpendicular to said partially threaded distal end, and where said bottom face intersects said an unthreaded shaft portion there is a radiuses, circumferential stress relief groove cut that removes any acute or right angled interface between said bottom planar face and said partially threaded distal end.

11. The multi hitch and alignment system of claim 10 wherein said stress relieve groove has a diameter, said diameter limited to a maximum of 25% of a diameter of the unthreaded shaft portion.

12. The multi hitch and alignment system of claim 11 wherein said ball has a stopped cylindrical recess formed therein and has two threaded ports extending normally from said stopped cylindrical recess at approximately 180 degrees apart on a surface of said ball that aligns with said two stopped bores formed into said ball connection peg.

13. The multi hitch and alignment system of claim 12 wherein said ball locks are partially threaded set screws that threadingly engage said threaded ports such that a non threaded portion of said ball locks extends into said two stopped bores formed in said ball connection peg.

14. A multi hitch system comprising:
a generally spherical hitch ball having a stopped cylindrical recess formed therein and two threaded ports extending normally from said stopped cylindrical recess at approximately 180 degrees apart on a surface of said ball;
a ball mount stud made of a cylindrical steel post having a distal partially threaded end for engagement with a nut, a proximate end formed into a ball connection peg for engagement with said cylindrical recess in said ball, and a partially conical seating flange extending around said steel post and that is located between said distal end and said proximate end, said ball connection peg having two stopped bores formed therein and that are formed about a common linear axis such that their openings reside 180 degrees apart on said ball connection peg and that align with said two stopped bores formed into the ball connection peg, and wherein said seating flange has a bottom planar face that resides perpendicular to said partially threaded distal end, and where said bottom face intersects said unthreaded shaft portion there is a radiused, circumferential stress relief groove cut that removes any acute or right angled interface between said bottom planar face and said partially threaded distal end; and
two ball locks that are partially threaded set screws that threadingly engage said threaded ports such that a non threaded portion of said ball locks extends into said two stopped bores formed in said ball connection peg; and
a base mount that may be removeably bolted to a towing vehicle's receiver tube mounting plate wherein said base mount is a planar hitch support plate with a mounting flange extending normally therefrom, and having bolt receiving orifices formed there through said hitch support plate for bolted connection to a receiver tube mounting plate, and wherein said hitch support plate has a partially circular orifice formed thereon that is greater than 180 degrees in circumference and which intersects a front peripheral edge of said hitch support plate and is sized to accommodates and retains said ball mount stud therein, and two tab receiving orifices formed thereon said hitch support plate;
an U shaped steel walled pintle hook alignment wedge removably affixed to said base mount that guides the placement of a pintle hook over said ball, said pintle hook alignment wedge having at two tabs extending therefrom for mating engagement with a ball mount alignment plate.

15. The multi hitch and alignment system of claim 14 further comprising a V shaped steel ball mount alignment plate that is removably affixed to said pintle hook alignment wedge, said ball mount alignment plate having two locating tabs extending therefrom so as to appear to a have a W configuration when viewed from a top side, said locating tabs configured for mating engagement with at least two locating slots in said pintle hook alignment wedge.

* * * * *